United States Patent
Davison et al.

(10) Patent No.: US 10,608,970 B2
(45) Date of Patent: Mar. 31, 2020

(54) MESSAGING FORWARDING SYSTEM AND METHOD

(71) Applicant: International Business Machines Corporation, Armonk, NY (US)

(72) Inventors: Leo J. Davison, Hursley (GB); Ian C. Edwards, Hursley (GB); Jonathan Levell, Hursley (GB); Andrew J. Schofield, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

(21) Appl. No.: 15/088,291

(22) Filed: Apr. 1, 2016

(65) Prior Publication Data
US 2017/0289084 A1    Oct. 5, 2017

(51) Int. Cl.
*H04L 12/58* (2006.01)
*H04L 29/06* (2006.01)
*H04L 29/08* (2006.01)

(52) U.S. Cl.
CPC .......... *H04L 51/14* (2013.01); *H04L 65/1069* (2013.01); *H04L 67/1004* (2013.01)

(58) Field of Classification Search
CPC . H04L 67/1002; H04L 51/14; H04L 65/1069; H04L 67/1004
See application file for complete search history.

(56) References Cited

U.S. PATENT DOCUMENTS

| | | | |
|---|---|---|---|
| 8,595,301 B2 | 11/2013 | Banks et al. | |
| 8,671,306 B2 | 3/2014 | Paramasivam et al. | |
| 2009/0327464 A1* | 12/2009 | Archer | G06F 15/173 709/223 |
| 2012/0278473 A1* | 11/2012 | Griffiths | H04L 67/141 709/224 |
| 2015/0067071 A1 | 3/2015 | Ravi et al. | |

(Continued)

OTHER PUBLICATIONS

Anonymously, "Automated scalability of queue based on the connecting applications"Ip.com, Jan. 24, 2013, of.1-6.

(Continued)

*Primary Examiner* — Kristie D Shingles
(74) *Attorney, Agent, or Firm* — Cantor Colburn LLP; Alexander Jochym (57) ABSTRACT

A messaging system having a cluster of receiving applications for handling received messages, and a cluster of messaging engines for receiving messages from one or more message sources and forwarding the received messages to one of the receiving applications is provided. Each messaging engine is operable to transmit load balancing information, the load balancing information comprising an indication of the current loading on the messaging engine. The receiving applications are instructed to establish a connection to receive messages from a particular messaging engine within the cluster based on the load balancing information. Accordingly, applications are able to receive messages in such a way that the messages do not build up unprocessed on a particular messaging engine for too long, and such that messages are routed to messaging engines where messages are being consumed, and so that the receiving applications receive messages from every messaging engine where messages are arriving.

21 Claims, 5 Drawing Sheets

(56) References Cited

U.S. PATENT DOCUMENTS

2015/0074259 A1* 3/2015 Ansari .................... H04L 67/02
709/224
2016/0219089 A1* 7/2016 Murthy ............... H04L 65/4076

OTHER PUBLICATIONS

C. Wickramarachchik, et al.,"Andes: a highly scalable persistent messaging system", International Conference on Web Services, IEEE, Jun. 24-29, 2012, p. 1-8.
F.Yang, et al.,"DZMQ: A Decentralized Distributed Messaging System for Realtime Web Applications and Services", Web Information System and Application Conference, IEEE, 2014, p. 1-7.
H. Jafarpour, et al.,"Dynamic Load Balancing for Cluster-Based Publish/Subscribe System", IEEE, Camera Ready, Oct. 2015, p. 1-7.

* cited by examiner

MESSAGING FORWARDING SYSTEM AND METHOD

BACKGROUND

The present invention relates to a messaging system and method for forwarding messages from messaging engines to receiving applications.

Messaging middleware, in the form of messaging engines, is commonly provided between message sources which generate messages and receiving applications with receive and consume the messages. Large amounts of data flow through messaging middleware every second, and often the flow of messages to a receiving application in relation to a single topic is too high for a single instance of the receiving application or a single messaging engine, to be able to cope. Messages in relation to a topic are therefore spread across many copies of the receiving application and many messaging engines. Co-ordinating these multiple receiving applications with multiple messaging engines is a difficult problem.

IBM® MQ (Message Queue) has utilised clustered queues for over 10 years. Messages are spread over copies of a queue on many queue managers. Applications make connections to all the queue managers containing copies of the queue. IBM MQ provides a sample program that can monitor a copy of a clustered queue and move the messages to other queue managers if no application is receiving them from the monitored copy. This system does not assist the copies of the receiving application find and balance across the queue managers hosting the queues. IBM is a trademark of International Business Machines Corporation, registered in many jurisdictions worldwide.

More recently Apache Kafka allows messages published on a single topic to be partitioned across a number of Kafka instances. Consumers identify themselves as part of a group and when a new consumer joins a group, the partitions are divided up amongst the current consumers in that group and the consumers are informed about which Kafka instances host the partitions they need to read from. With this approach each partition can only be read by a single consumer and the number of partitions is relatively static, hence dynamically scaling up and down the number of consuming applications is problematic (a lot of partitions need to be created to be able to scale the number of consuming applications up but this is complex and high-overhead at small numbers of consumers). Moreover, if the rate of messages published to a single partition is higher than the rate that the connected consumer can service them, a backlog builds up; other connected consumers can't help out. Lastly, partitions are assigned to consumers in a very simple fashion, a faster consumer with a fast link is not given more partitions than a slower one.

SUMMARY

According to an aspect of the present invention, there is provided a messaging system, which includes: a cluster of receiving applications, each for handling received messages; and a cluster of messaging engines, each for receiving messages from one or more message sources and forwarding the received messages to one of the receiving applications. Each messaging engine is operable to transmit load balancing information, the load balancing information comprising an indication of the current loading of the messaging engine receiving applications are instructed to establish a connection to receive messages from a particular messaging engine within the cluster.

According to another aspect of the present invention, there is provided a messaging method of forwarding messages from a cluster of messaging engines to a cluster of receiving applications, comprising transmitting load balancing information from each of the messaging engines in the cluster, the load balancing information comprising an indication of the current loading of the messaging engine; and instructing one or more of the receiving applications to establish a connection to receive messages from a particular messaging engine within the cluster.

According to a further aspect of the present invention, the is provided A computer program product for controlling forwarding of messages from a cluster of messaging engines to a cluster of receiving applications, the computer program product comprising a computer readable storage medium having program instructions embodied therewith, the program instructions executable by a data processing apparatus to cause the data processing apparatus to perform a method that includes transmitting load balancing information from each of the messaging engines in the cluster, the load balancing information comprising an indication of a current loading on the messaging engine; and instructing one or more of the receiving applications to establish a connection to receive messages from a particular messaging engine within the cluster based the load balancing information.

Other aspects of the present invention include a computer program for controlling the forwarding of messages from a cluster of messaging engines to a cluster of receiving applications.

BRIEF DESCRIPTION OF THE DRAWINGS

The present invention will now be described, by way of example only, with reference to one embodiment, as illustrated in the following figures.

DETAILED DESCRIPTION

In exemplary embodiments, applications are able to receive messages in such a way that the messages do not build up unprocessed on a particular messaging engine for too long, and such that messages are routed to messaging engines where messages are being consumed (by way of being forwarded to a receiving application), and so that the receiving applications receive messages from every messaging engine where messages are arriving. This facilitates the scaling of receiving applications in distributed messaging systems. A multitude of connections from a number of instances of a message receiving application may thus be dynamically load balanced across a cluster of messaging engines to ensure efficient delivery of messages across the instances of the receiving application.

In one embodiment, each receiving application communicates with a messaging engine to which it is connected a number of connections which it can make to messaging engines, and each messaging engine includes in its transmitted load balancing information an indication of the number of connections which can be made by the receiving applications to which it is transmitting messages. A receiving application may be operable to subscribe to a message topic serviced by the cluster of messaging engines, and to indicate a number of connections which it is prepared to make in relation to that message topic and a number of existing connections it has in relation to that message topic. The load balancing information may comprise an indication of in relation to which message topics the messaging engine hosts a message buffer, which receiving applications are connected to the message engine, and the number of connections those receiving applications are prepared to make in relation to that message topic. In this way, the unused message receiving and handling capacity of particular receiving applications can be taken into account when determining how connections should be allocated between messaging engines and receiving applications.

Existing connections between receiving applications and messaging engines may be moved to other messaging engines and/or new connections may be established between receiving applications and messaging engines in order to balance the load between the messaging engines within the cluster, in order that in relation to each messaging engine there are connected receiving applications with the capacity to receive all the messages received at that messaging engine, or in order that each messaging engine is connected to a number of different receiving applications.

In one implementation, a messaging engine may determine, from its own load balancing information and the load balancing information received from the other messaging engines within the cluster, that one or more of the other messaging engines requires additional connections to receiving applications, and based on this determination instruct one or more of the receiving applications to which it is currently connected to establish connections with the one or more messaging engines determined to require additional connections.

In another implementation, a first messaging engine may be operable to determine, from its own load balancing information and the load balancing information received from the other messaging engines within the cluster, one or more receiving applications which are able to establish connections with the first messaging engine, and to request a messaging engine having a current connection with the determined receiving applications to instruct those receiving applications to establish a connection with the first messaging engine.

In yet another implementation, the load balancing information may be transmitted from each messaging engine to one of the messaging engines configured as a leader, and wherein the leader messaging engine is operable to determine, from its own load balancing information and the load balancing information received from the other messaging engines within the cluster, that one or more of the leader messaging engines and/or the other messaging engines requires additional connections to receiving applications, and based on this determination causing one or more receiving applications to establish a connection with a messaging engine determined to require additional connections.

In still another implementation, the load balancing information may be transmitted from each messaging engine to a controller which is operable to determine, from the load balancing information received from the messaging engines, that one or more of the messaging engines requires additional connections to receiving applications, and based on this determination causing one or more receiving applications to establish a connection with a messaging engine determined to require additional connections.

In one implementation, the number of messaging engines within the cluster is reduced if the load balancing information indicates that the overall load on the cluster of messaging engines drops below a first predetermined threshold. In this case, if the number of messaging engines is reduced, connections between the receiving applications and the reduced number of messaging engines are redistributed from the messaging engine removed from the cluster to the remaining messaging engines. Similarly, the number of messaging engines within the cluster can be increased if the load balancing information indicates that the overall load on the cluster of messaging engines exceeds a second predetermined threshold. In this case, if the number of messaging engines is increased, some of the existing connections between the receiving applications and one or more of the existing messaging engines are redistributed to the additional messaging engine. In this way, the number of messaging engines in operation can be varied so that all active messaging engines are utilised effectively while switching off (for example) any messaging engines not required in order to achieve effective utilisation.

In one embodiment the present invention provides a messaging system, wherein a messaging engine determines, from its own load balancing information and the load balancing information received from the other messaging engines within the cluster, that one or more of the other messaging engines requires additional connections to receiving applications, and based on this determination instructs one or more of the receiving applications to which it is currently connected to establish connections with the one or more messaging engines determined to require additional connections.

In one embodiment the present invention provides a messaging system, wherein a first messaging engine is operable to determine, from its own load balancing information and the load balancing information received from the other messaging engines within the cluster, one or more receiving applications which are able to establish connections with the first messaging engine, and to request a messaging engine having a current connection with the determined receiving applications to instruct those receiving applications to establish a connection with the first messaging engine.

In one embodiment the present invention provides a messaging system, wherein the load balancing information is transmitted from each messaging engine to one of the messaging engines configured as a leader, and wherein the leader messaging engine is operable to determine, from its own load balancing information and the load balancing information received from the other messaging engines within the cluster, that one or more of the leader messaging engines and/or the other messaging engines requires additional connections to receiving applications, and based on this determination causing one or more receiving applications to establish a connection with a messaging engine determined to require additional connections.

In one embodiment the present invention provides a messaging system, wherein the load balancing information is transmitted from each messaging engine to a controller which is operable to determine, from the load balancing information received from the messaging engines, that one or more of the messaging engines requires additional connections to receiving applications, and based on this determination causing one or more receiving applications to establish a connection with a messaging engine determined to require additional connections.

In one embodiment the present invention provides a messaging system, wherein the load balancing information comprises one or more of the number of messages yet to be sent from the messaging engine to receiving applications, a rate at which messages are arriving at the messaging engine, and a rate at which messages are being forwarded by the messaging engine.

In one embodiment the present invention provides a messaging system, wherein each receiving application communicates with a messaging engine to which it is connected a message consumption rate which it can support from messaging engines, and wherein each messaging engine includes in its transmitted load balancing information an indication of the message consumption rate which can be supported by the receiving applications to which it is transmitting messages, and wherein receiving applications are selected to establish connections with a particular messaging engine within the cluster based on their available message consumption rate.

In one embodiment the present invention provides a messaging system, wherein all receiving applications within the cluster perform the same operation in relation to the received messages.

In one embodiment the present invention provides a messaging system, wherein the operation is one or more of updating a database, monitoring data contained within the received messages and triggering an action in response to the monitored data, and performing analytics on data contained within the received messages.

In one embodiment the present invention provides a messaging system, wherein the number of messaging engines within the cluster is reduced if the load balancing information indicates that the overall load on the cluster of messaging engines drops below a first predetermined threshold.

In one embodiment the present invention provides a messaging system, wherein if the number of messaging engines is reduced, connections between the receiving applications and the reduced number of messaging engines are redistributed from the messaging engine removed from the cluster to the remaining messaging engines.

In one embodiment the present invention provides a messaging system, wherein the number of messaging engines within the cluster is increased if the load balancing information indicates that the overall load on the cluster of messaging engines exceeds a second predetermined threshold.

In one embodiment the present invention provides a messaging system, wherein if the number of messaging engines is increased, some of the existing connections between the receiving applications and one or more of the existing messaging engines are redistributed to the additional messaging engine.

In one embodiment the present invention provides a messaging system, wherein the load balancing information comprises an indication of which connections have a current transaction.

In one embodiment the present invention provides a messaging system, wherein if a receiving application is instructed to transfer an existing connection from one messaging engine to another messaging engine while the receiving of or handling of a message by the receiving application is currently in progress, the transfer is carried out by one of: transferring immediately to the new messaging engine and having the new messaging engine handle the pending message; or waiting for completion of the handling of the pending message.

Figure 1:
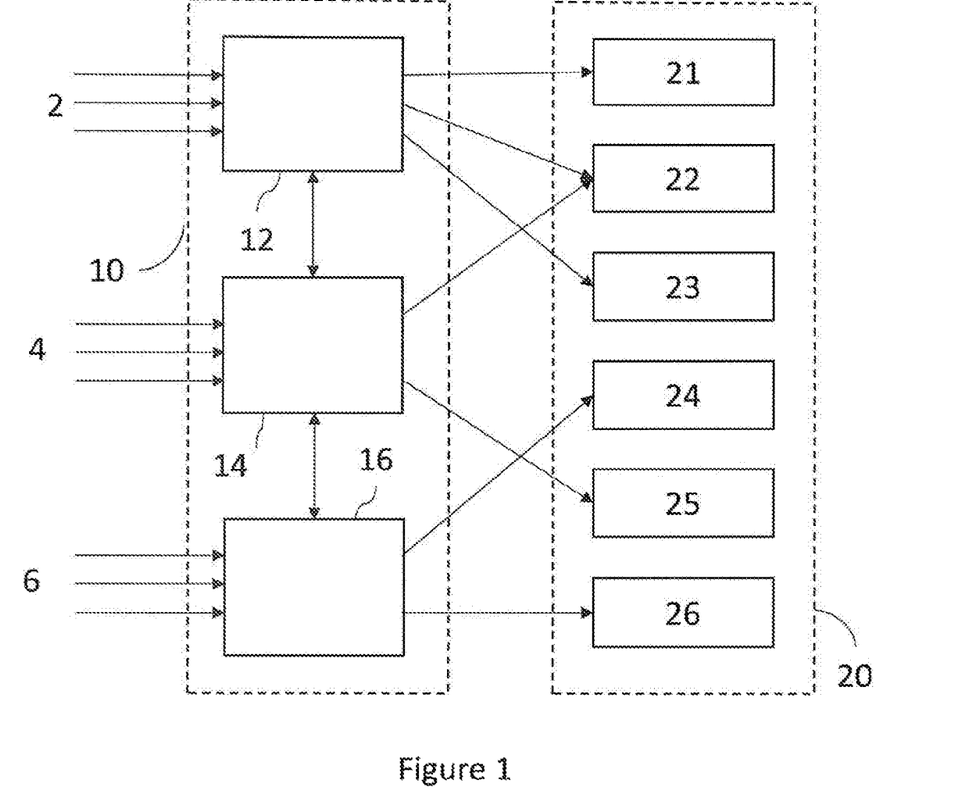
FIG. 1 schematically illustrates a cluster of messaging engines forwarding messages to receiving applications within a cluster of receiving applications.

Referring to FIG. 1, a cluster 10 of messaging engines 12, 14, 16 receives messages from message sources (not shown), and forwards those messages on to a cluster 20 of receiving applications 21, . . . 26. In particular, the messaging engine 12 receives a set 2 of messages from various message sources, the messaging engine 14 receives a set 4 of messages from various message sources, and the messaging engine 16 receives a set 6 of messages from various message sources. The present technique seeks generally to balance the workload across the messaging engines 12, 14, 16 (and any other messaging engines present—it will be appreciated that the present technique is not limited to 3 messaging engines) without needing to frequently request the sources of the messages to use different ones of the messaging engines. In other words, the present technique seeks generally to control workload by influencing the rate at which messages are consumed (forwarded on) by the messaging engines. As will be understood from the below explanation, this is achieved by controlling the connections between the messaging engines 12, 14, 16 and receiving applications 21, 22, 23, 24, 25, 26. In FIG. 1, it can be seen that the messaging engine 12 is currently connected with, and sending messages to, the receiving applications 21, 22 and 23, the messaging engine 14 is currently connected with, and sending message to, the receiving application 22 and the receiving application 25, and the messaging engine 16 is currently connected with, and sending messages to, the receiving application 24 and the receiving application 26. It can also be seen from FIG. 1 that the messaging engines 12, 14, 16 are in communication with each other, via data connections 32. This enables work balancing information to be shared between messaging engines, as will be described below. Generally, the cluster 20 of receiving applications each performs the same operation in relation to the received messages. The operation may for example be one or more of updating a database with information contained within received messages, monitoring data contained within the received messages and triggering an action in response to the monitored data (for example comparing data values contained within messages with thresholds, or against conditions), and performing analytics on data contained within the received messages (for example aggregating and processing data contained within the received messages). It will be understood that each of the messaging engines within the cluster 10 may be implemented on a server running suitable messaging middleware software. Similarly, it will be appreciated that each of the receiving applications within the cluster 20 may be implemented on a server running suitable message handling and processing software. The servers within each of the clusters 10, 20 may be co-located or geographically distributed. FIG. 1 illustrates the handling of messages in relation to a particular topic, for example, messages which relate to the same type of event or message content type. The topic may be a device update report for a particular type of device. Devices of this type generate messages reporting their present status and send these messages to the receiving applications via the messaging engines. The receiving applications then carry out the above-mentioned actions in relation to the information carried in these messages. The messages may be generated over time, with an even or uneven temporal distribution. It will be understood that this is just one example of a topic, and other thematic or custom groupings could be used.

Figure 2:
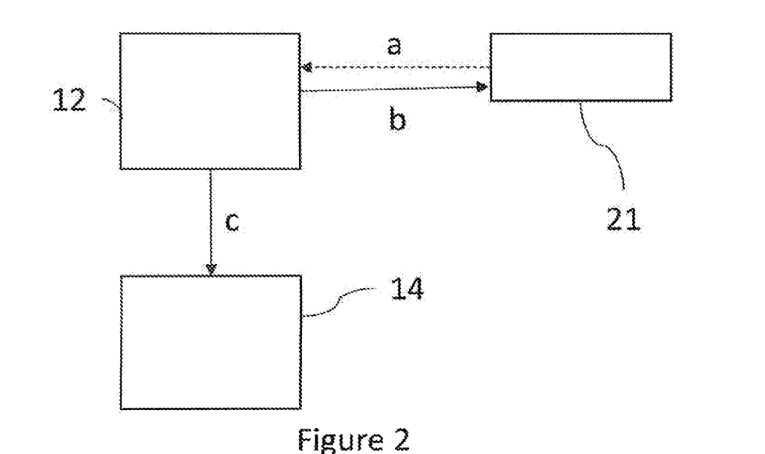
FIG. 2 schematically illustrates a signal flow between messaging engines and a receiving application when the receiving application subscribes to receive messages in relation to a topic.

In order to receive messages in relation to a particular topic, a receiving application is required to subscribe to that topic, in the present case via one or more of the messaging engines. Referring to FIG. 2, the receiving application 21 subscribes to a topic by issuing a subscribe control signal a to the messaging engine 12. This control signal establishes a connection to one of the engines in the cluster (in this case the engine 12) and indicates how many connections the receiving application is prepared to make for that subscription. Each instance of an application (that is, each receiving application) therefore needs a unique identifier so the cluster can determine the availability of connections to each instance. For example, receiving application 21 may be capable of up to 5 connections, and may currently have two connections, one to the messaging engine 12 and the other to another messaging engine (not depicted). In this case, there are three further connections which can be made if required. Each connection effectively increases the rate at which messages can be forwarded on from the cluster 10 to the cluster 20. It will be appreciated that different receiving applications may have different numbers of connections, or different bandwidth connections. For example, the receiving application 21 may support 5 connections while the receiving application 23 may support 15 connections.

The present technique does not necessarily require a subscription needs to be made on each desired messaging engine. Instead, creating a subscription may be applied across all members of the cluster (for example by sharing the subscription request on the signal path 32). In one implementation, subscriptions may be (automatically) dynamically distributed across a cluster of messaging engines, dependent on the current load on that subscription. Initially, a subscription may be balanced across a small number of the cluster members, partitioning to additional members as the load on that subscription increases. Conversely, the number of cluster members servicing that subscription could be reduced (potentially towards a minimum number of members) under a lighter load in order to reduce the inter-cluster communication necessary for maintaining the cluster state.

The messaging engines publish information (to the other members of the cluster) about subscription buffers they are hosting, receiving applications connected to them (and how many connections those receiving applications are prepared to make for each subscription). The messaging engines can be considered to broadcast information to each other. This meta data can either use the same mechanism used to transmit messages between then or some side channel (for example multi-cast or an intermediary like Consul or Zoo-keeper). For each subscription on a messaging engine, it should broadcast the number of messages yet to be sent to the subscribers and the rate at which messages are arriving and the rate at which they are being sent to receiving applications. Each messaging engine should also broadcast details of applications connected including what subscriptions they are consuming from, how many other connections that instance has said it is prepared to make and the rate at which messages have been sent to it.

Based on the above information shared between the messaging engines, decisions are made regarding which receiving applications should move existing connections between messaging engines or establish new connections to messaging engines, and the receiving applications are informed about servers they need to connect to. Decisions regarding moving and/or establishing connections may be made such that, on each messaging engine there are receiving applications with the capacity to receive all the messages arriving at that engine and/or such that each messaging engine has a number of different receiving instances connected to it so that a failure of an application instance doesn't cause messages to build up unconsumed until a rebalancing has been completed. The information about subscriptions and connections may be available to all members of the cluster. In one implementation, messaging engines are divided into workers which forward messages and broadcast the information and controllers which process the broadcast information. The controllers could either act as workers as well or could be dedicated (and, in fact, run different software to the worker engines). The current state of subscription buffers is regularly re-examined and receiving applications are told how to rebalance There are a number of options for where the decision should be made. The simplest option may be for messaging engines that have an over-supply of application receiving capacity to instruct some of the receiving applications which it is connected with to move to other engines where it is needed. A downside to this model is that if a messaging engine needs more applications to connect to it, it may be sent too many connections as individual message engines each push some connections to it. A further option is for a messaging engine that needs more connections to pull connections to it, by examining the broadcast meta-data and instructing a particular messaging engine within the cluster to send it a connection from a particular receiving application. A potential disadvantage of this option is that the messaging engines that are being overloaded are the engines that have to calculate where to get capacity from, making the problem worse. A further option is for one messaging engine within the cluster to be chosen to be the leader (either one leader for each subscription or possibly one leader for multiple subscriptions). This controlling engine analyses the data from all the engines and directs capacity as appropriate. This option is the most complex (managing leader changes is complicated as engines join/leave the cluster but there are common algorithms that can be used to "elect" the leader such as Paxos or Raft).

Figure 3:
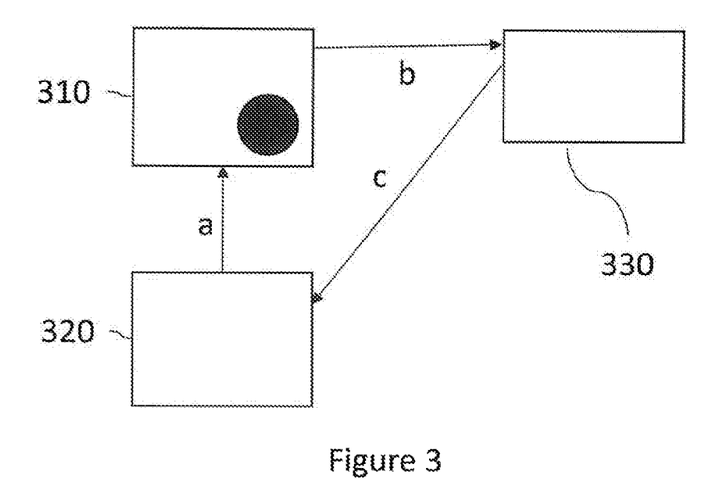
FIG. 3 schematically illustrates a signal flow between messaging engines and a receiving application when a messaging engine having an oversupply of message receiving capacity determines that one or more connections should be made to another messaging engine.
Figure 4:
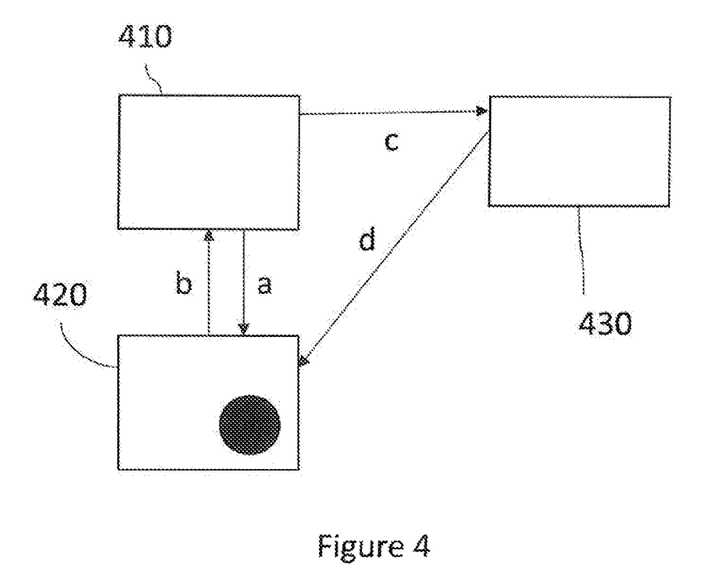
FIG. 4 schematically illustrates a signal flow between messaging engines and a receiving application when a messaging engine determines that one or more connections should be made to itself from receiving applications currently connected to other messaging engines.
Figure 5:
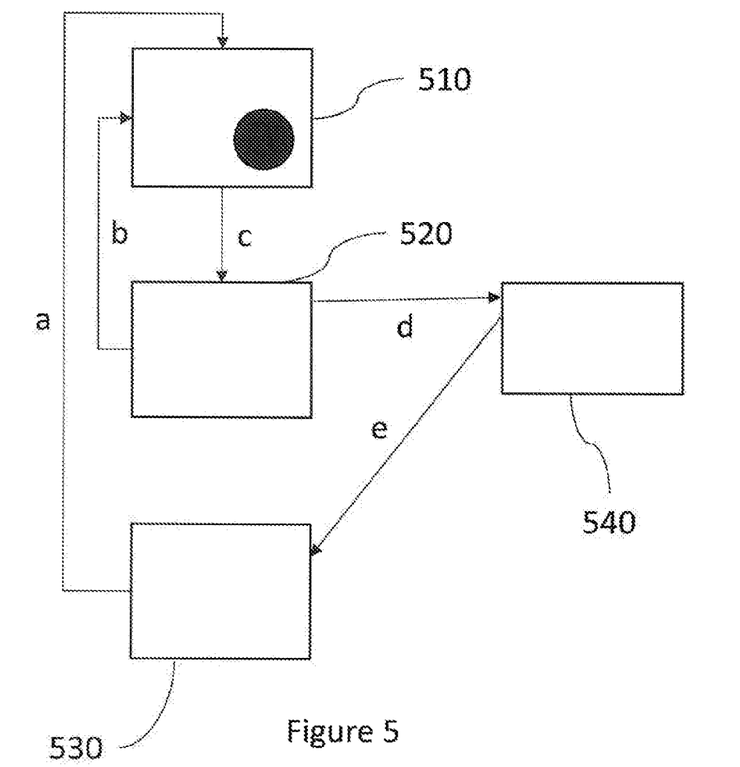
FIG. 5 schematically illustrates a signal flow between messaging engines and a receiving application when a nominated messaging engine, or a controller, determines that one or more connections should be transferred from one messaging engine to another messaging engine.

FIGS. 3, 4 and 5 provide examples of the signal flow which may occur for these various options. In FIG. 3, a messaging engine 310 having an oversupply of message receiving capacity determines that one or more connections should be made to another messaging engine 320. In particular, it determines that in order to balance the message forwarding workload, a receiving application 330 should establish a connection with the messaging engine 320. This could involve terminating an existing connection the receiving application 330 has with the messaging engine 310, or could involve retaining the existing connection to the messaging engine 310 and making an additional connection to the messaging engine 320. In any case, the decision making process starts with the messaging engine 320 providing its load balancing information to the messaging engine 310 as signal a. As a result, the messaging engine 310 is in possession of both its own load balancing information and that of the messaging engine 320. It will also be in possession of load balancing information from any other messaging engines within the cluster. Based on the load balancing information, the messaging engine 310 decides that the receiving application 330 should establish a connection with the messaging engine 320. This decision may be based for example on determining that the messaging engine 320 is overloaded, and that the receiving applications currently connected to the messaging engine 310 have additional receiving capacity which could be utilised by the messaging engine 320, and/or that the messaging engine 310 is less overloaded than the messaging engine 320 and so connections can be moved from the messaging engine 310 to the messaging engine 320. The messaging engine 310 then transmits a signal b to the receiving application 330, requesting it to establish a connection with the messaging engine 320. It will be appreciated that the signal b can be easily provided to the receiving application 330 since the messaging engine 310 and the receiving application 330 are already communicating with each other. In response, the receiving application 330 sends a signal c to the messaging engine 320 in order to make a connection. The message c may contain an indication of the connections which the receiving application has in total and which messaging engines it is currently connected to (or in the alternative the number of available additional connections which it can make). In response, the messaging engine 320 is able to forward further messages on to the receiving application 330.

In FIG. 4, a messaging engine 420 that is overloaded determines that one or more connections should be made to itself from receiving applications currently connected to another messaging engine 410. In particular, it determines that in order to balance the message forwarding workload, a receiving application 430 should establish a connection with itself. This could involve terminating an existing connection the receiving application 430 has with the messaging engine 410, or could involve retaining the existing connection to the messaging engine 410 and making an additional connection to the messaging engine 420. In any case, the decision making process starts with the messaging engine 410 providing its load balancing information to the messaging engine 420 as signal a. As a result, the messaging engine 420 is in possession of both its own load balancing information and that of the messaging engine 410. It will also be in possession of load balancing information from any other messaging engines within the cluster. Based on the load balancing information, the messaging engine 420 decides that the receiving application 430 should establish a connection with the messaging engine 420 (that is, itself). This decision may be based for example on determining that the messaging engine 420 is overloaded, and that the receiving applications currently connected to the messaging engine 410 have additional receiving capacity which could be utilised by the messaging engine 420, and/or that the messaging engine 410 is less overloaded than the messaging engine 420 and so connections can be moved from the messaging engine 410 to the messaging engine 420. The messaging engine 320 then transmits a signal b to the messaging engine 410 requesting it to in turn transmit a signal c to the receiving application 430, requesting it to establish a connection with the messaging engine 420. It will be appreciated that the signal c can be easily provided to the receiving application 430 since the messaging engine 410 and the receiving application 430 are already communicating with each other. In response, the receiving application 430 sends a signal d to the messaging engine 420 in order to make a connection. The message d may contain an indication of the connections which the receiving application has in total and which messaging engines it is currently connected to (or in the alternative the number of available additional connections which it can make). In response, the messaging engine 420 is able to forward further messages on to the receiving application 430.

In FIG. 5, a nominated messaging engine (within the cluster), or a controller, 510 determines that one or more connections should be made from receiving applications currently connected to another messaging engine 520. A nominated messaging engine is a messaging engine within the cluster which (like the other messaging engines within the cluster) is responsible for forwarding message, but which has also been nominated to control the load balancing process. A controller, on the other hand, does not have a message forwarding function but is responsible for controlling the load balancing process. Either way, the controller 510 determines that in order to balance the message forwarding workload, a receiving application 540 should establish a connection with a messaging engine 530. This could involve terminating an existing connection the receiving application 540 has with the messaging engine 520, or could involve retaining the existing connection to the messaging engine 520 and making an additional connection to the messaging engine 530. In any case, the decision making process starts with the messaging engines 520, 530 providing their load balancing information to the controller/engine 510 as signals a and b. As a result, the controller 510 is in possession of load balancing information for both the messaging engines 520 and 530 (and also itself in the case that it is a nominated messaging engine). It will also be in possession of load balancing information from any other messaging engines within the cluster. Based on the load balancing information, the controller 510 decides that the receiving application 540 should establish a connection with the messaging engine 530. This decision may be based for example on determining that the messaging engine 530 is overloaded, and that the receiving applications currently connected to the messaging engine 520 have additional receiving capacity which could be utilised by the messaging engine 530, and/or that the messaging engine 520 is less overloaded than the messaging engine 530 and so connections can be moved from the messaging engine 520 to the messaging engine 530. The controller 510 then transmits a signal c to the messaging engine 520 requesting it to in turn transmit a signal d to the receiving application 540, requesting it to establish a connection with the messaging engine 530. It will be appreciated that the signal d can be easily provided to the receiving application 540 since the messaging engine 520 and the receiving application 540 are already communicating with each other. In response, the receiving application 540 sends a signal e to the messaging engine 530 in order to make a connection. The message e may contain an indication of the connections which the receiving application has in total and which messaging engines it is currently connected to (or in the alternative the number of available additional connections which it can make). In response, the messaging engine 530 is able to forward further messages on to the receiving application 540.

If transactions are supported then rebalancing a connection with a pending action/transaction by moving that connection from one messaging engine to another is a complication that can be dealt with in a number of ways. Firstly, the connection could just be moved if the new messaging engine (cluster members) can complete it. Secondly, the receiving application could wait for completion of the transaction (especially if they are known (or expected) to be short lived). Thirdly, information about which connections have a current transaction can be broadcast between the messaging engines so that these connections are not available to the rebalancing algorithm and inflight connections are not asked to move. It will be appreciated that some combination of the latter two options could be carried out, with the number of connections with transactions inflight is regularly broadcast but if necessary, a connection can be asked to move. Additionally, this could be extended so that, based on local resource availability where the application is running, the number of connections it is willing to make can change—this may include breaking connections it had already made if required. Another extension is that by configuration of the cluster and/or the receiving application instances, certain instances could have (a subset) of their connections tied to a particular messaging engine (that is, they will not be touched by the workload balancing algorithm) and the load balancing algorithm would ensure that these requirements are met.

Figure 6:
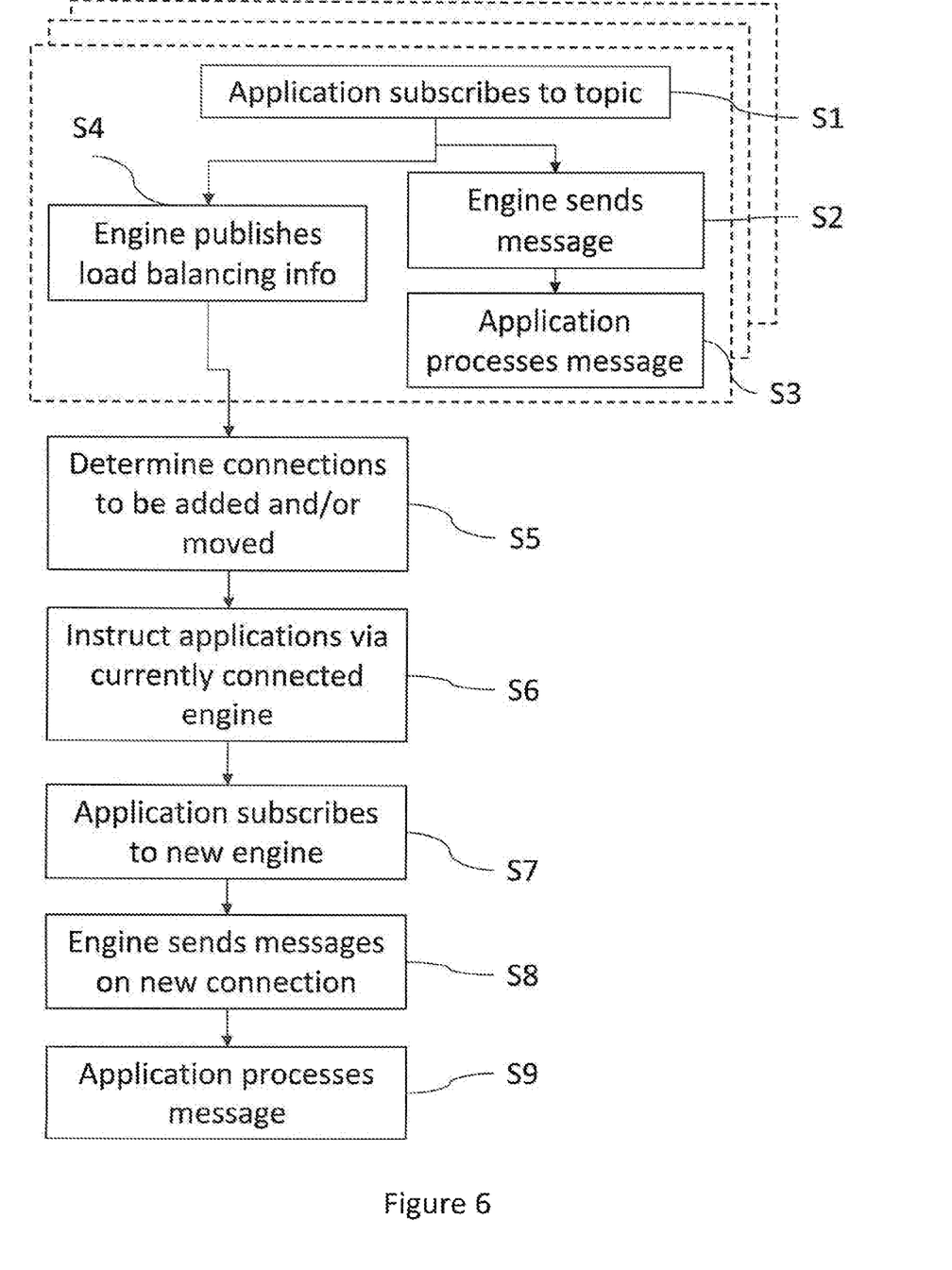
FIG. 6 is a schematic flow diagram of a method of balancing the workload of messaging engines in forwarding messages to receiving applications.

Referring to FIG. 6, a schematic flow diagram of a method of balancing the workload of messaging engines in forwarding messages to receiving applications is provided. At a step S1, a receiving application subscribes to a topic and connects to a messaging engine. The messaging engine then starts forwarding messages to the receiving application at a step S2, which are processed by the receiving application at a step S3. At a step S4, the messaging engine published load balancing information to the other messaging engines. It will be appreciated that the steps S1 to S4 are carried out in relation to each new subscription/connection made by receiving applications to the cluster of messaging engines. At a step S5, the workload balancing algorithm determines connections to be added/moved as described above. The receiving applications are instructed to add/move connections at a step S6 via messaging engines to which they are currently connected. At a step S7, the receiving application, therefore, subscribes to the new engine (and potentially disconnects from the existing engine), following which the new messaging engine starts sending messages to the receiving application on the newly established connection. Finally, at a step S9, the receiving application processes the received messages. The steps S5 to S9 will be carried out not only when new subscriptions are made by receiving applications, but also in response to increases in the volume of incoming messages to the various messaging engines within the cluster, in response to backlogs of queued messages at the messaging engines, and in response to new messaging engines being added to the cluster, or existing messaging engines being removed from the cluster.

Figure 7:
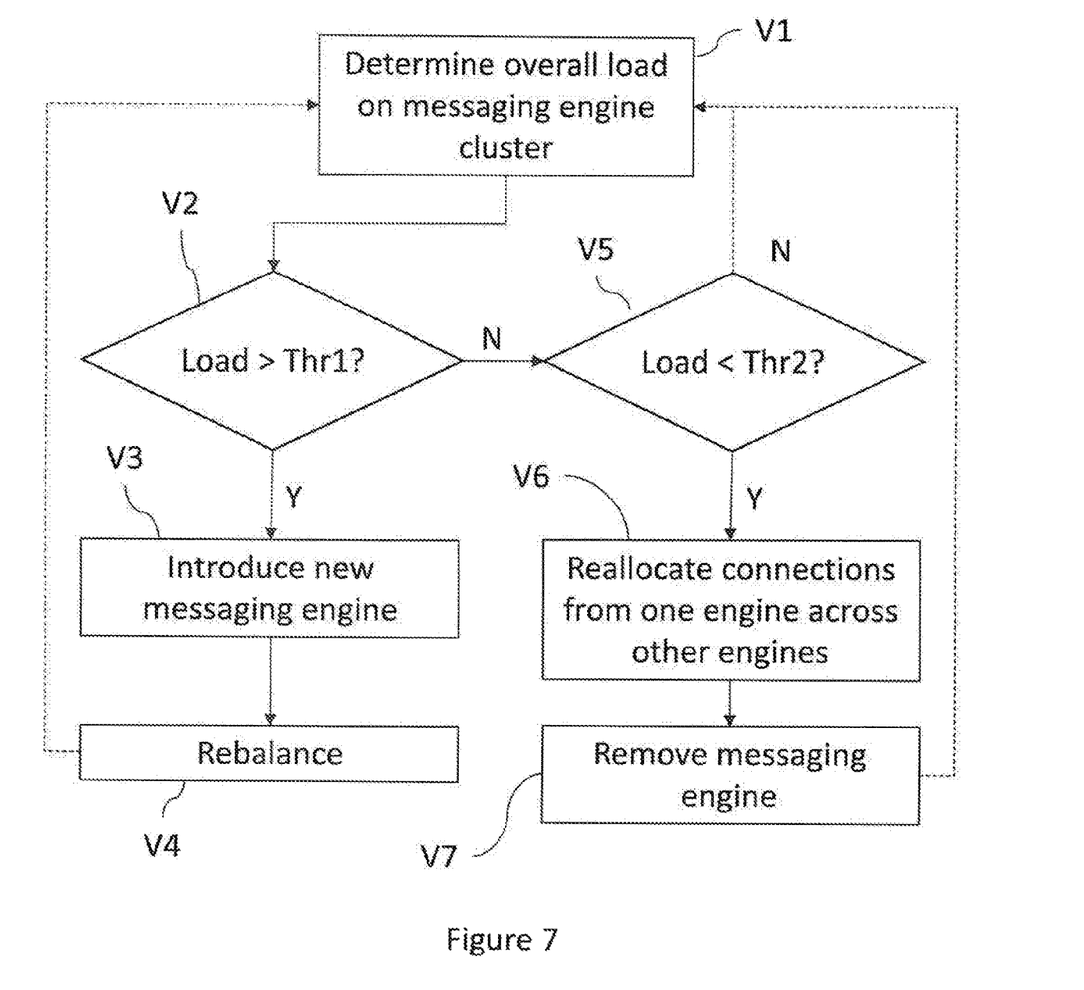
FIG. 7 is a schematic flow diagram of a method of adding and removing messaging engines from a cluster in response to workload variations.

Referring to FIG. 7, a schematic flow diagram of a method of adding and removing messaging engines from a cluster in response to workload variations is provided. At a step V1, an overall load on the cluster of messaging engines is determined. At a step V2, the determined load is compared with a first threshold Thr1. If the load is greater than the first threshold, a new messaging engine is introduced into the cluster at a step V3, in order to ease the burden on the existing engines. At a step V4, the load is balanced across the cluster by moving or adding connections from receiving applications to the newly added messaging engine. The process then returns to the step V1. Alternatively, it at the step V2 it is determined that the load is not greater than the first threshold Thr1, it is compared with a second threshold Thr2 (which can be expected to be less than the first threshold Thr1). If the load is less that the second threshold Thr2, then at a step V6 the connections from one of the messaging engines are reallocated to others of the messaging engines within the cluster, and the now unserviced messaging engine is then removed from the cluster at a step V7. The process then returns to the step V1. If at the step V3 it is determined that the load is not less than the second threshold Thr2, then the process returns to the step V1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may computer copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A messaging system, comprising:
   a cluster of receiving applications, each disposed on a first set of servers for handling received messages; and
   a cluster of messaging engines, each disposed on a second set of servers, that are separate from the first server, for receiving messages from one or more message sources and forwarding the received messages to at least one of the receiving applications;
   wherein:
   each receiving application is operable to subscribe to a message topic serviced by the cluster of messaging engines, and to indicate a number of connections which it is prepared to make in relation to that message topic and a number of existing connections it has in relation to that message topic;
   a first messaging engine in the cluster of messaging engines is operable to receive load balancing information from each of the messaging engines in the cluster of messaging engines, the load balancing information comprising an indication of a current load on each of the messaging engine;
   the first messaging engine is operable to determine an available load for a second messaging engine based at least in part on the load balancing information from each of the messaging engines in the cluster;
   based on the available load for the second messaging engine, one or more of the receiving applications are instructed, by the first messaging engine, to establish a connection to receive messages from the second messaging engine within the cluster of messaging engines; and
   based on the load balancing information indicating that an overall load on the cluster of messaging engines drops below a first threshold, reducing a number of messaging engines in the cluster of messaging engines.

2. A messaging system according to claim 1, wherein each receiving application communicates to a messaging engine to which it is connected a number of connections which it can make to messaging engines, and wherein each messaging engine includes in its transmitted load balancing information an indication of the number of connections which can be made by the receiving applications to which it is transmitting messages.

3. A messaging system according to claim 1, wherein existing connections between receiving applications and messaging engines are moved to other messaging engines and/or new connections are established between receiving applications and messaging engines in order to balance the load between the messaging engines within the cluster.

4. A messaging system according to claim 1, wherein existing connections between receiving applications and messaging engines are moved to other messaging engines and/or new connections are established between receiving applications and messaging engines in order that in relation to each messaging engine there are connected receiving applications with capacity to receive all the messages received at that messaging engine.

5. A messaging system according to claim 1, wherein existing connections between receiving applications and messaging engines are moved to other messaging engines and/or new connections are established between receiving applications and messaging engines in order that each messaging engine is connected to a number of different receiving applications.

6. A messaging system according to claim 1, wherein a receiving application is instructed to establish a connection with a particular messaging engine by a messaging engine which is currently connected to the receiving application.

7. A messaging system according to claim 1, wherein an instruction to establish a connection is an instruction to move a connection between the receiving application and a first messaging engine to a second messaging engine.

8. A messaging system according to claim 1, wherein an instruction to establish a connection is an instruction to maintain the receiving application's existing connections with one or more of the messaging engines and to establish an additional connection with one of the messaging engines.

9. A messaging system according to claim 1, wherein the load balancing information comprises an indication of in relation to which message topics the messaging engine hosts a message buffer, which receiving applications are connected to the message engine, and a number of connections those receiving applications are prepared to make in relation to that message topic.

10. A messaging system according to claim 1, wherein the load balancing information is transmitted from each messaging engine to each other messaging engine within the cluster.

11. A messaging method of forwarding messages from a cluster of messaging engines disposed on a first set of servers to a cluster of receiving applications disposed on a second set of servers, comprising:
   receiving, by a first messaging engine of in the cluster of messaging engines from a first receiving application in the cluster of receiving applications, a subscription request for subscribing to a message topic serviced by the first messaging engine in the cluster of messaging engines, the subscription request indicating a number of connections which the first receiving application is prepared to make in relation to the message topic and a number of existing connections the first receiving application has in relation to the message topic, wherein the first messaging engine comprises a subscription buffer associated with the message topic;
   receiving, by the first messaging engine, load balancing information from each of the messaging engines in the cluster, the load balancing information comprising an indication of a current load on each messaging engine;
   determining, by the first messaging engine, an available load for a second messaging engine based at least in part on the load balancing information from each of the messaging engines in the cluster;
   instructing, by the first messaging engine, one or more receiving applications to establish a connection to receive messages from the second messaging engine within the cluster based on the available load for the second messaging engine; and
   reducing a number of messaging engines in the cluster of messaging engines, based on the load balancing information indicating that an overall load on the cluster of messaging engines drops below a first threshold.

12. A messaging method according to claim 11, further comprising each receiving application communicating to a messaging engine to which it is connected a number of connections which it can make to messaging engines, and wherein each messaging engine includes in its transmitted load balancing information an indication of the number of connections which can be made by the receiving applications to which it is transmitting messages.

13. A messaging method according to claim 11, further comprising moving existing connections between receiving applications and messaging engines to other messaging engines and/or establishing new connections between receiving applications and messaging engines in order to balance the load between the messaging engines within the cluster.

14. A messaging method according to claim 11, further comprising moving existing connections between receiving applications and messaging engines to other messaging engines and/or establishing new connections between receiving applications and messaging engines in order that in relation to each messaging engine there are connected receiving applications with capacity to receive all the messages received at that messaging engine.

15. A messaging method according to claim 11, further comprising moving existing connections between receiving applications and messaging engines to other messaging engines and/or establishing new connections between receiving applications and messaging engines in order that each messaging engine is connected to a number of different receiving applications.

16. A messaging method according to claim 11, further comprising instructing a receiving application to establish a connection with a particular messaging engine by a messaging engine which is currently connected to the receiving application.

17. A messaging method according to claim 11, wherein the instruction to establish a connection is an instruction to move a connection between the receiving application and a first messaging engine to a second messaging engine.

18. A messaging method according to claim 11, wherein the instruction to establish a connection is an instruction to maintain the receiving application's existing connections with one or more of the messaging engines and to establish an additional connection with one of the messaging engines.

19. A messaging method according to claim 11, wherein the load balancing information comprises an indication of in relation to which message topics the messaging engine hosts a message buffer, which receiving applications are connected to the message engine, and a number of connections those receiving applications are prepared to make in relation to that message topic.

20. A messaging method according to claim 11, further comprising transmitting the load balancing information from each messaging engine to each other messaging engine within the cluster.

21. A computer program product for controlling forwarding of messages from a cluster of messaging engines to a cluster of receiving applications, the computer program product comprising a computer readable storage medium having program instructions embodied therewith, the program instructions executable by a data processing apparatus to cause the data processing apparatus to perform a method comprising:
   receiving, by a first messaging engine in the cluster of messaging engines from a first receiving application in the cluster of receiving applications, a subscription request for subscribing to a message topic serviced by the first messaging engine in the cluster of messaging engines, the subscription request indicating a number of connections which the first receiving application is prepared to make in relation to the message topic and a number of existing connections the first receiving application has in relation to the message topic, wherein the first messaging engine comprises a subscription buffer associated with the message topic;

receiving, by the first messaging engine, load balancing information from each of the messaging engines in the cluster, the load balancing information comprising an indication of a current load on each messaging engine;

determining, by the first messaging engine, an available load for a second messaging engine based at least in part on the load balancing information from each of the messaging engines in the cluster;

instructing, by the first messaging engine, one or more of the receiving applications to establish a connection to receive messages from the second messaging engine within the cluster based the available load for the second messaging engine; and reducing a number of messaging engines in the cluster of messaging engines, based on the load balancing information indicating that an overall load on the cluster of messaging engines drops below a first threshold.

* * * * *